United States Patent [19]
Drabik et al.

[11] Patent Number: 6,141,072
[45] Date of Patent: Oct. 31, 2000

[54] SYSTEM AND METHOD FOR EFFICIENT MANUFACTURING OF LIQUID CRYSTAL DISPLAYS

[75] Inventors: Timothy J. Drabik; Paul A. Kohl, both of Atlanta, Ga.

[73] Assignee: Georgia Tech Research Corporation, Atlanta, Ga.

[21] Appl. No.: 09/054,188

[22] Filed: Apr. 2, 1998

Related U.S. Application Data

[60] Provisional application No. 60/042,515, Apr. 4, 1997.

[51] Int. Cl.[7] .................. G02F 1/1333; G02F 1/1341; C30B 33/00; B23P 15/00; C03C 25/00
[52] U.S. Cl. ..................... 349/122; 349/189; 216/23; 216/39; 445/24
[58] Field of Search ................................. 349/122, 138, 349/189; 438/619; 445/24; 216/23, 39

[56] References Cited

U.S. PATENT DOCUMENTS

| | | | |
|---|---|---|---|
| 4,346,963 | 8/1982 | Kobale et al. | 349/122 |
| 4,705,360 | 11/1987 | Funada et al. | 350/344 |
| 4,824,215 | 4/1989 | Joseph et al. | 350/339 D |
| 5,005,951 | 4/1991 | Te Velde | 349/189 |
| 5,056,893 | 10/1991 | Holz et al. | 359/54 |
| 5,106,197 | 4/1992 | Ohuchida et al. | 359/83 |
| 5,164,853 | 11/1992 | Shimazaki | 359/82 |
| 5,238,435 | 8/1993 | Te Velde | 445/24 |
| 5,365,356 | 11/1994 | McFadden | 359/62 |
| 5,383,040 | 1/1995 | Kim | 359/54 |
| 5,414,545 | 5/1995 | Lee | 359/53 |
| 5,459,597 | 10/1995 | Yamamoto et al. | 359/80 |
| 5,459,598 | 10/1995 | Carrington | 359/81 |
| 5,508,134 | 4/1996 | Shirai | 430/20 |
| 5,548,429 | 8/1996 | Tsujita | 359/80 |
| 5,587,817 | 12/1996 | Miyamoto et al. | 349/187 |
| 5,677,749 | 10/1997 | Tsubota et al. | 349/160 |
| 5,699,138 | 12/1997 | Watanabe et al. | 349/189 |
| 5,706,069 | 1/1998 | Hermens et al. | 349/153 |

*Primary Examiner*—Walter Malinowski
*Attorney, Agent, or Firm*—Thomas, Kayden, Horstemeyer, & Risley, L.L.P.

[57] ABSTRACT

The present invention enables efficient microfabrication of a fully integrated liquid crystal display device. Initially, a sacrificial layer is formed on a substrate that has conductive pads connected thereto. The sacrificial layer is patterned, and portions of the sacrificial layer are removed to expose portions of the underlying layer supporting the sacrificial layer. Then, a permeable layer is formed on the sacrificial layer, thereby filling in the space vacated by the removed potions of the sacrificial layer. The structure is heated and the material of the sacrificial layer is allowed to dissolve into and dissipate through the permeable layer in order to leave a cavity. Once the sacrificial layer is removed, the permeable layer is supported by the portion of the permeable layer filling in the space vacated by the removed portions of the sacrificial layer. Accordingly, a monolithic liquid crystal display is easily and reliably formed without having to etch an opening in the structure to allow the sacrificial material to egress from the structure and without having to separately attach mechanical components to each liquid crystal display manufactured.

34 Claims, 8 Drawing Sheets

SYSTEM AND METHOD FOR EFFICIENT MANUFACTURING OF LIQUID CRYSTAL DISPLAYS

CLAIM OF PRIORITY AND CROSS REFERENCE TO RELATED APPLICATION

This document claims priority to and the benefit of the filing date of copending provisional application entitled FABRICATED PROCEDURE FOR INTEGRATED PLANAR CAVITIES WITH APPLICATIONS TO DISPLAYS AND ADVANCED HYBRID SYSTEMS, assigned Ser. No. 60/042,515, and filed Apr. 4, 1997, which is hereby incorporated herein by reference as if set out in full hereinbelow. Furthermore, this document is related to copending U.S. patent application entitled FABRICATION OF A SEMICONDUCTOR DEVICE WITH AIR GAPS FOR ULTRA-LOW CAPACITANCE INTERCONNECTIONS, assigned Ser. No. 09/009,952, and filed Jan. 21, 1998, which is incorporated herein by reference as if set out in full hereinbelow.

FIELD OF THE INVENTION

The present invention generally relates to microfabrication and integrated circuit techniques and, in particular, to a system and method for microfabricating liquid crystal displays by creating cavities within microfabricated devices and filling the cavities with liquid crystal.

BACKGROUND OF THE INVENTION

Conventional liquid crystal displays (LCDs) include a substrate with a transparent cover connected thereto and disposed thereover. A cavity is formed between the substrate and the transparent cover, and the cavity is filled with liquid crystal. Optical properties of the liquid crystal change as an electric field that is applied across the liquid crystal changes. Therefore, by controlling the electric field appearing across portions of the liquid crystal, the optical properties of the liquid crystal can be changed in order to display information in the form of characters or numbers, for example.

However, many prior art techniques of manufacturing a liquid crystal display individually connect the transparent cover to each substrate. Therefore, production of many substrates in parallel, at the wafer-scale, of liquid crystal displays is hindered. Furthermore, application of a separate transparent cover is subject to error in the thickness uniformity of the liquid crystal material, deriving from imperfect flatness or parallelism of the substrate and cover. Therefore, the process of individually connecting a transparent cover oftentimes requires precise tolerances, which can be difficult to obtain.

Furthermore, in creating conventional liquid crystal displays, as well as many other types of microfabricated devices, a sacrificial layer is oftentimes deposited and then later removed through conventional microfabrication techniques, such as etching. The deposition and later removal of the sacrificial layer enables cavities or other hollow areas to be formed during the manufacturing process.

One prior art method for forming hollow areas within microfabricated devices includes the step of forming a porous material to encapsulate sacrificial material. The porous material includes many thousands of tiny holes that allow gases to pass through the porous material. Oxygen or an oxygen-plasma is allowed to move through the porous material, thereby vaporizing the sacrificial layer when the device is exposed to high temperatures (e.g., greater than 100 degrees Celsius). The gaseous sacrificial material egresses through the pores of the porous material leaving a hollow area where the sacrificial material once resided. The opening is usually plugged during a subsequent deposition step in order to seal the microfabricated device.

However, this type of technique for removing a sacrificial layer through a porous material requires the extra steps of exposing the device to oxygen plasma. The exposure of the device to oxygen-plasma can be potentially damaging to other elements of the device. Furthermore, the process of forming a suitable porous material can be difficult, since thousands of tiny holes need to be formed in order to develop a porosity sufficient for allowing sacrificial material to escape. Furthermore, as the porosity of the material is increased, the mechanical stability of the material is typically decreased. Therefore, manufacturing a sufficiently porous material that can withstand the high pressures associated with dissipating sacrificial material can be very difficult and costly.

Due to many difficulties, including the difficulties of forming cavities for liquid crystal displays, prior art techniques of manufacturing liquid crystal displays are inefficient and do not usually integrate liquid crystal displays onto a single substrate where mechanical components, such as the covers mentioned hereinbefore, are not separately attached. Thus, a heretofore unaddressed need exists in the industry for providing a system and method to efficiently microfabricate a fully integrated liquid crystal display.

SUMMARY OF THE INVENTION

The present invention overcomes the inadequacies and deficiencies of the prior art as discussed herein. The present invention provides a system and method for efficiently microfabricating a fully integrated liquid crystal display.

The present invention utilizes a base, a conductive pad permeable material, liquid crystal, a contact and a transparent conductor. The conductive pad is formed on the base, and the permeable material is formed on sacrificial material, which is configured to dissolve into and dissipate through the permeable material when the sacrificial material is heated. Liquid crystal is formed in the cavity which is between the conductive pad and permeable material. The transparent conductor is formed such that the liquid crystal resides between the transparent conductor and the conductive pad. The transparent conductor is coupled to a voltage contact, and the voltage difference between the transparent conductor and the conductive pad creates an electric field that appears across the liquid crystal. By varying the electric field applied across the liquid crystal, the optical properties of the liquid crystal can be changed in order to change the appearance of the liquid crystal to an observer.

In accordance with another feature of the present invention, the sacrificial material is preferably formed on the conductive pad and on exposed portions of the base prior to formation of the permeable material. The sacrificial material is preferably patterned in order to expose portions of the base. Once the permeable layer is formed, the sacrificial material is preferably dissipated through the permeable material in order to form a cavity. The cavity is then filled with the liquid crystal.

The present invention can also be viewed as providing a method for microfabricating a liquid crystal display. Briefly described, the method can be broadly conceptualized by the following steps: forming a conductive pad on a base; forming sacrificial material on the pad; patterning the sacrificial material to expose a portion of the base; forming permeable material on the sacrificial material and the exposed portion of the base; dissipating the sacrificial material through the permeable material in order to form a cavity; filling the cavity with liquid crystal; forming a transparent conductor; and creating a voltage difference between the transparent conductor and the conductive pad to apply an electric field across the liquid crystal.

The present invention has many advantages, a few of which are delineated hereafter, as mere examples.

An advantage of the present invention is that liquid crystal displays can be microfabricated on a wafer-scale.

Another advantage of the present invention is that liquid crystal displays can be efficiently microfabricated.

Another advantage of the present invention is that liquid crystal displays can be efficiently microfabricated without forming a multitude of openings to allow sacrificial material to dissipate.

Another advantage of the present invention is that cavities within liquid crystal displays can be formed and filled with liquid crystal with only one hole punctured into the liquid crystal display.

Other features and advantages of the present invention will become apparent to one skilled in the art upon examination of the following detailed description, when read in conjunction with the accompanying drawings. It is intended that all such features and advantages be included herein within the scope of the present invention as is defined by the claims.

BRIEF DESCRIPTION OF THE DRAWINGS

The invention can be better understood with reference to the following drawings. The elements of the drawings are not necessarily to scale relative to each other, emphasis instead being placed upon clearly illustrating the principles of the invention. Furthermore, like reference numerals designate corresponding parts throughout the several views.

DETAILED DESCRIPTION OF THE INVENTION

Generally described, the present invention provides a system and method for efficiently forming fully integrated liquid crystal displays. Since the liquid crystal displays are fully integrated, they can be easily and efficiently manufactured on a wafer-scale at a tremendous reduction in manufacturing cost. As used herein, the term "fully integrated" device is defined as a device formed through known microfabrication techniques, such as layer deposition, without the attachment of separate mechanical components.

Figure 1A:
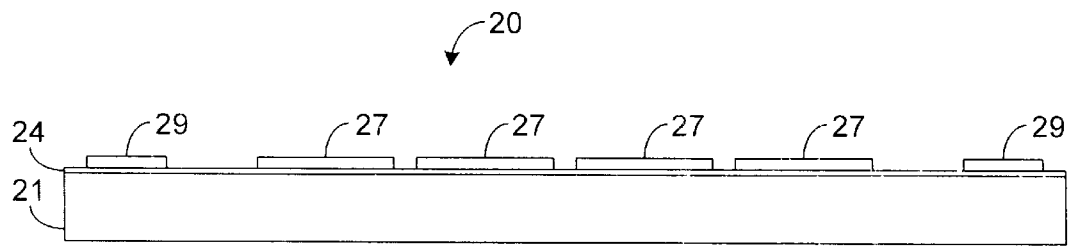
FIG. 1A is a side view of a device having conductive pads formed thereon in accordance with the principles of the present invention.

FIG. 1 depicts a liquid crystal display (LCD) device 20 in initial stages of manufacture according to the principles of the preferred embodiment of the present invention. FIG. 1A shows a side view of a substrate 21 having a dielectric or insulator layer 24 formed on a top surface of the substrate 21. The substrate 21 is preferably monolithic, and the insulator layer 24 preferably acts as a base for forming additional layers or structures, as will be discussed in further detail hereinbelow.

Figure 1B:
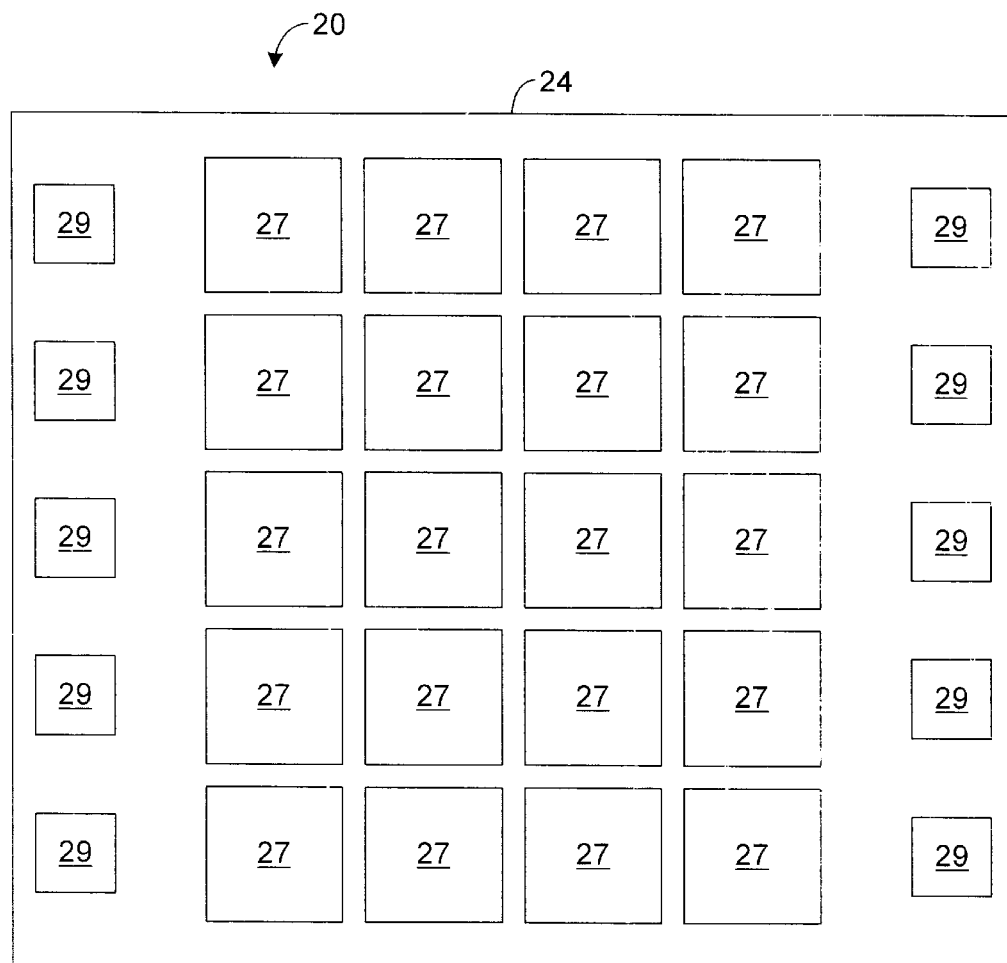
FIG. 1B is a top view of the device shown in FIG. 1A.

Conductive pads 27 are preferably formed or deposited on the insulator layer 24, according to FIGS. 1A and 1B. The material of conductive pads 27 is preferably a metal in order to allow the voltage of the pads 27 to be easily changed. The conductive pads 27 can be constructed with normal microfabrication techniques known in the art. Consistent with conventional microfabrication practices, circuitry for addressing the pads 27 is located beneath insulator layer 24 and connects to the pads 24 through electrical vias that pass through the insulator layer 24. In addition, voltage contacts 29 are preferably formed on insulator layer 24 and are connected to a common voltage so that each contact 29 has the same voltage potential.

Although not necessary for implementation of the present invention, it may be desirable to form a molecular alignment layer on the surface of conductive pads 27. The molecular alignment layer may facilitate the preferential molecular alignment needed for proper crystal light modulator operation. Inorganic alignment layers such as obliquely evaporated oxides, should be compatible with the device 20, which is described in further detail hereinafter.

Figure 2A:
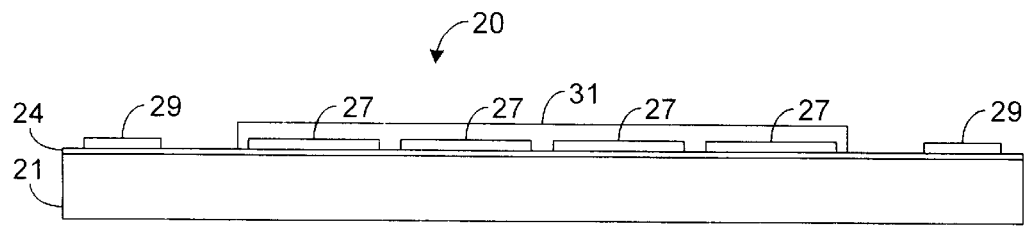
FIG. 2A is a cross sectional view of the device shown in FIG. 1 after a sacrificial layer has been formed.
Figure 2B:
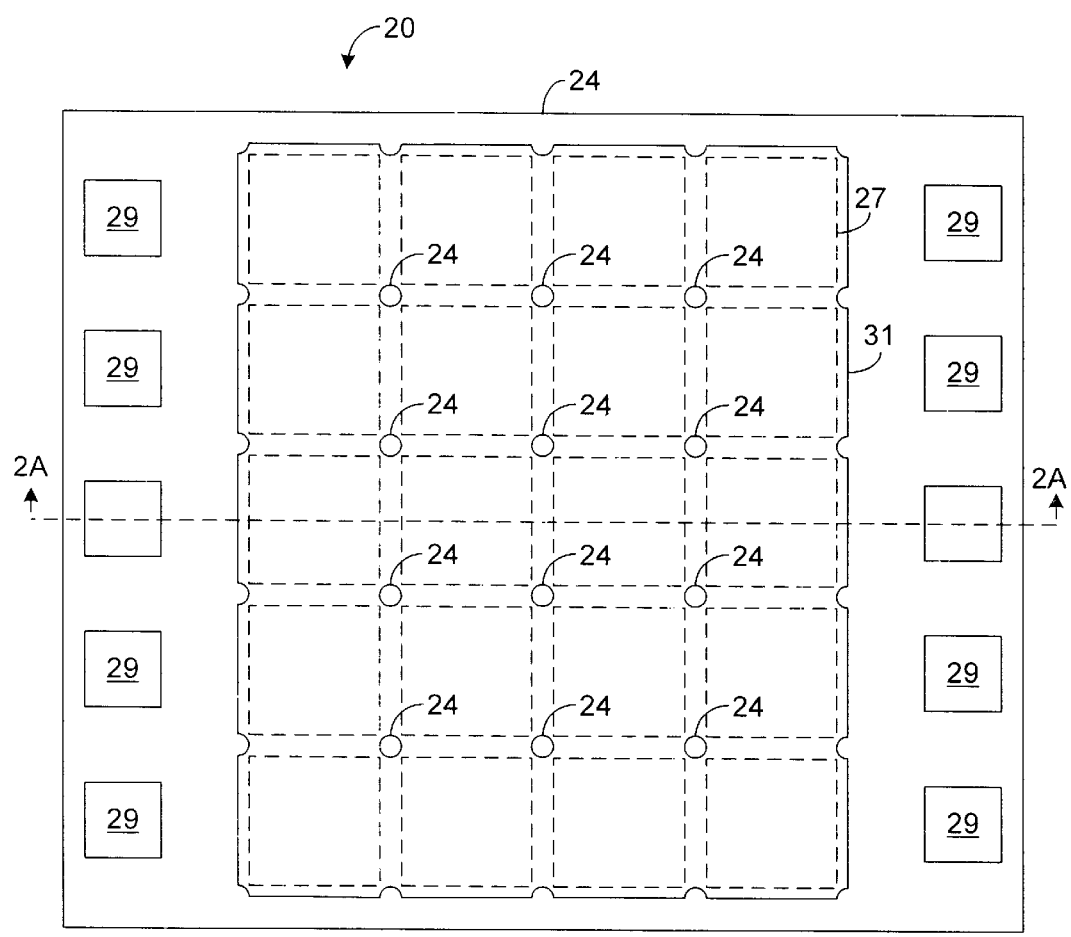
FIG. 2B is a top view of the device shown in FIG. 2A.

Once the conductive layers 27 are formed, a sacrificial layer 31 is preferably formed or deposited on top of the conductive layers 27 and exposed portions of the insulator layer 24, as depicted by FIGS. 2A and 2B. The sacrificial layer 31 is preferably patterned to completely remove the sacrificial layer 31 at various locations. In the preferred embodiment, the sacrificial layer 31 is removed in order to form circular holes in various areas that expose the insulator layer 24, as depicted by FIG. 1B. For illustrative purposes, FIG. 2B depicts, via dashed reference lines, the conductive pads 27 which are located beneath the sacrificial layer 31, as depicted by FIG. 2A. It should be apparent to one skilled in the art that the sacrificial layer 31 may be removed at various other locations without departing from the principles of the present invention.

Figure 3A:
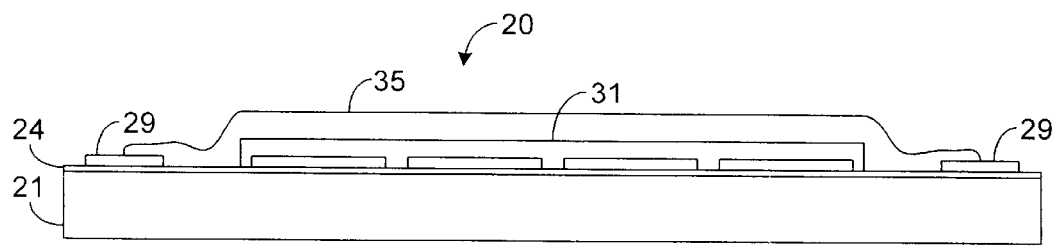
FIG. 3A is a cross sectional view of the device shown in FIG. 2 after a permeable layer has been formed on the sacrificial layer.
Figure 3B:
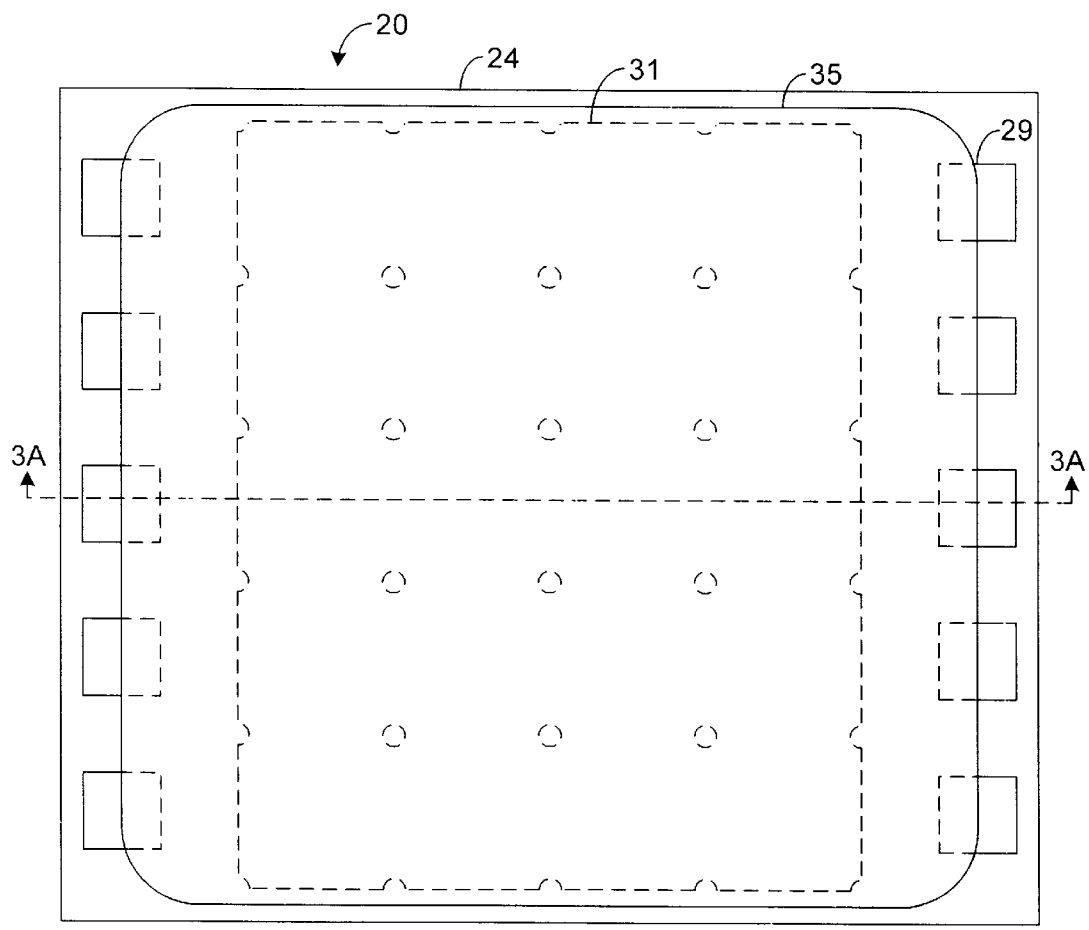
FIG. 3B is a top view of the device shown in FIG. 3A.

After formation of the sacrificial layer 31, a permeable layer 35 is preferably formed on the device 20 through microfabrication techniques, as shown by FIGS. 3A and 3B. For illustrative purposes, FIG. 3B shows, via dashed reference lines, the portions of sacrificial layer 31 and contacts 29 that underlie permeable layer 35. In addition to covering the sacrificial layer 35, the permeable layer 35 is configured to fill in the holes patterned in the sacrificial layer 31. Furthermore, in the preferred embodiment, the permeable layer 35 is designed as an insulator.

The material of the permeable layer 35 is configured to allow the sacrificial layer 31 to pass through the permeable layer 35 when the sacrificial layer 31 is heated. The permeable layer 35 is preferably comprised of silicon dioxide which can be formed on the device 20 by chemical vapor deposition or other suitable process. However, other materials for the permeable layer 35 are also possible. For example, many chemicals in the polymide class of chemicals are suitable for allowing sacrificial material to dissolve into and diffuse through it. Any material capable of allowing the material of the sacrificial layer 31 to dissipate through it is sufficient for the purposes of the present invention. Since, the sacrificial layer 31 is capable of dissipating through the permeable layer 35, an opening does not need to be created to allow the sacrificial layer 31 to egress from the device 20.

In the preferred embodiment, the permeable layer 35 is fully dense, unlike the porous material described hereinbefore in the Background section. Therefore, the material of the permeable layer 35 is a low-porosity solid, and tiny holes do not have to be formed in the material of the permeable layer 35 in order to increase the layer's 35 porosity for allowing sacrificial material to egress.

Furthermore, although not necessary for successful implementation of the present invention, the permeable layer 35 may be thinned by polishing, etching or any other suitable technique to reduce the layer's 35 thickness and/or to improve the layer's 35 planarity. In this regard, reduction in the thickness of the permeable insulator layer 35 increases the electric field applied across the liquid crystal, which will be discussed in further detail hereinafter. In addition, improved planarity of the permeable insulator layer 35 can improve the optical performance of the device 20.

It may be desirable to form alignment layers during the manufacturing process in order to properly align the layers of the structure 20. In this regard, alignment layers can be formed through deposition and rubbing of polymers or by evaporation of oxide layers onto an obliquely oriented surface. For example, a polymer alignment layer can be formed by spin-depositing polymer onto the conductive pads 27 and buffing the deposited polymer prior to the formation of the sacrificial layer 31. Alternatively, the polymer alignment layer can be formed on the sacrificial layer 31 once the sacrificial layer 31 has been formed on the conductive contacts 27. An oxide, or other suitable, alignment layer can be similarly formed on the conductive pads 27 or the sacrificial layer 31. Furthermore, deposition of a separate alignment layer can be avoided by rubbing or polishing the surface of the sacrificial layer 31 after formation of the sacrificial layer 31.

Once the sacrificial layer 31 and the permeable layer 35 are formed, the device 20 is heated to a sufficient temperature to convert the sacrificial layer 31 from a solid state to a gaseous state. The gaseous state of the sacrificial material is configured to permeate through the permeable layer 35 as the sacrificial material is heated. Since the permeable layer 35 is preferably of a low porosity the material of the sacrificial layer 31 dissolves into and diffuses through the permeable layer 35 until the sacrificial material escapes from the permeable layer 35 and, hence, the device 20.

Figure 4A:
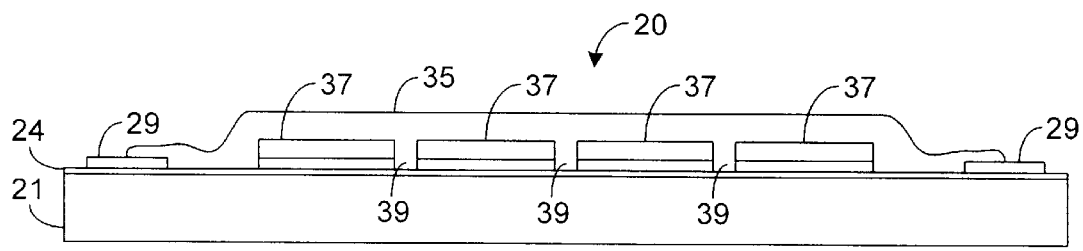
FIG. 4A is a cross sectional view of the device shown in FIG. 3 after the sacrificial layer has been removed from the device.
Figure 4B:
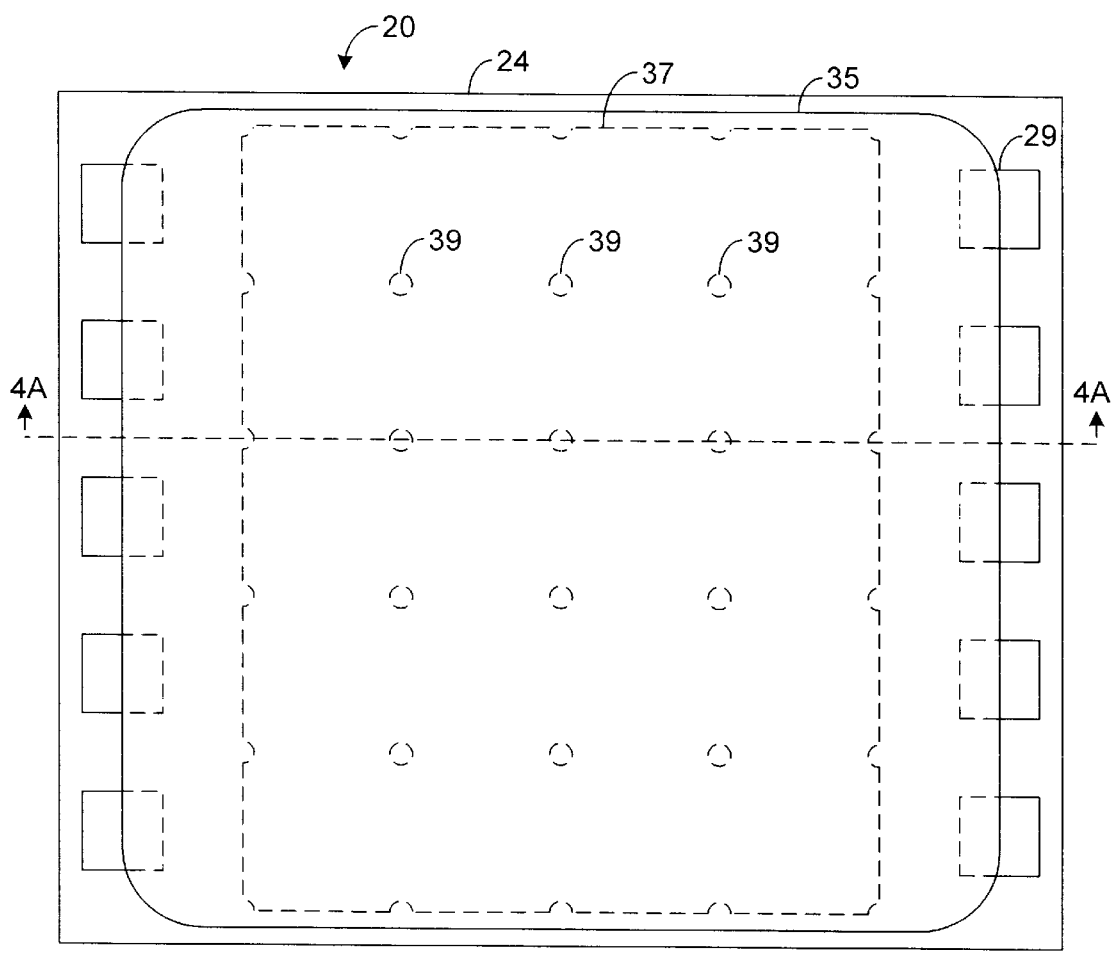
FIG. 4B is a top view of the device shown in FIG. 4A.

The removal of the sacrificial layer 31 leaves a cavity or a hollow area 37 within the device 20, as depicted by FIG. 4. In this respect, the permeable layer 35 acts as a canopy suspended over the conductive pads 27 and supported by the portion 39 of the permeable layer 35 which previously filled in the holes of the sacrificial layer 31. Therefore, the portion 39 of the permeable layer 35 which filled in the holes of the sacrificial material 31 now acts as pillars 39 that support the permeable layer 35. As a result, the area 37 vacated by the sacrificial layer 35 should define a cavity 37 within device 20, and formation of this cavity 37 does not require the layer 35 to be punctured in order to allow the sacrificial layer 31 to egress from the device 20.

Although it is preferable to remove the sacrificial layer 31 through vaporization as described hereinabove, other techniques for removing the sacrificial layer are also possible. For example, layer 35 may be comprised of porous material rather than dense permeable material. Therefore, it is possible to remove all or some of the sacrificial layer 31 through the pores of the porous material as described in U.S. Pat. No. 5,461,003 filed on May 27, 1994 by Havemann et al., which is incorporated herein by reference as if set out in full hereinbelow. Although different techniques may be more desirable than others, any technique for removing the sacrificial layer 31 should be sufficient.

Figure 5A:
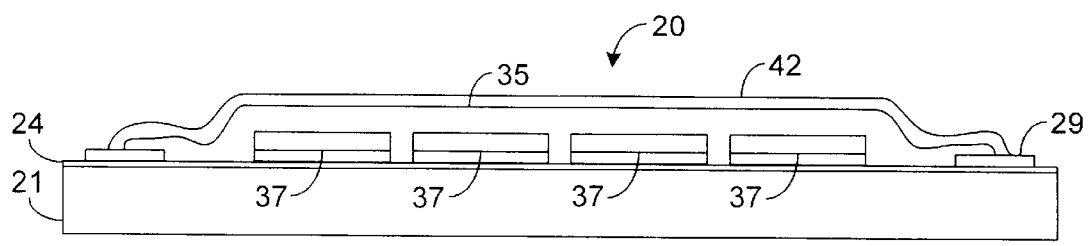
FIG. 5A is a cross sectional view of the device shown in FIG. 4 after a transparent conductor has been formed on the permeable layer.
Figure 5B:
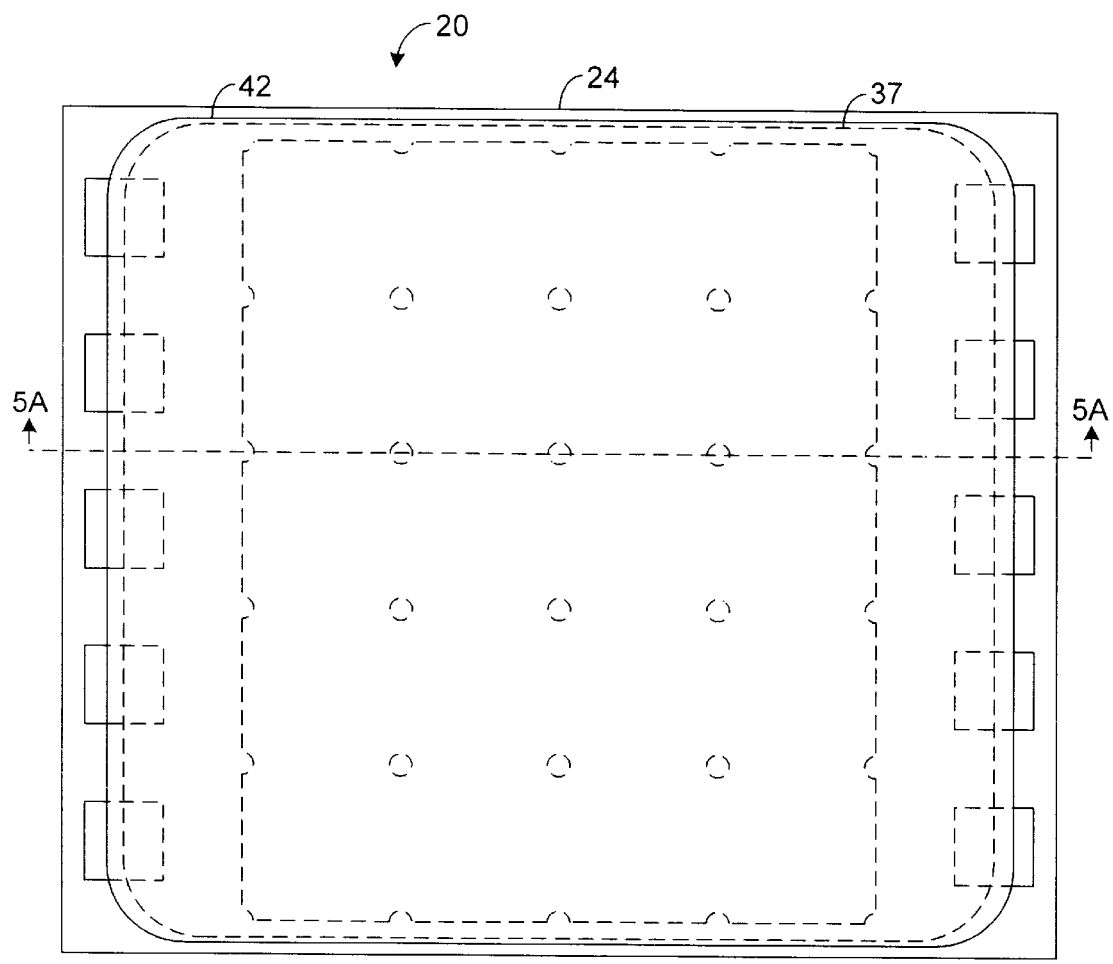
FIG. 5B is a top view of the device shown in FIG. 5A.

After the sacrificial layer 31 is removed, a transparent conductor 42 is preferably formed or deposited on the permeable layer 35, as depicted by FIGS. 5A and 5B. The transparent conductor 42 may be comprised of any suitable material sufficient for conducting electricity and allowing light to pass. For example, the transparent conductor 42 may be comprised of a conductive oxide, such as indium tin oxide ($In_xSn_yO$), or a conductive film that is thin enough to be transparent. Furthermore, the transparent conductor 42 should be coupled to the contacts 29, which are at a common voltage.

A small opening is preferably etched or punctured into the permeable layer 35 and into the transparent conductor 42 in order to allow liquid crystal to be inserted into the cavity 37. The permeable layer 35 can be punctured by lithography or dry etching, for example. After puncturing the permeable layer 35, the cavity 37 is preferably filled with liquid crystal by capillary filling. In this regard, the device 20 is preferably heated to a temperature above the isotropic phase transition temperature of the liquid crystal. The device 20 is then placed in a vacuum chamber, which is evacuated. By introducing the crystal material to the opening of the cavity under these conditions, the liquid crystal should fill the cavity 37 completely. The temperature of the device may then be lowered, and the vacuum chamber may be pressurized. Preferably, the temperature is lowered along a carefully controlled trajectory in order to induce favorable molecular alignment of the liquid crystal. The opening may be sealed, if desired.

It should be apparent to one skilled in the art that the insertion of liquid crystal can be performed subsequent to the formation of the permeable layer 35 and prior to the formation of the transparent conductor 42. In this regard, only the permeable layer 35 is punctured to admit the liquid crystal. However, in either embodiment, only one puncture hole is sufficient for completely inserting the liquid crystal, but multiple puncture holes may be formed in order to expedite the process of filling the cavities 37.

Figure 6A:
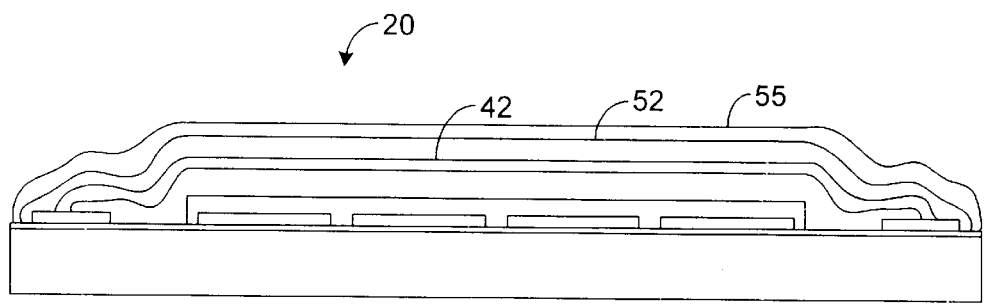
FIG. 6A is a cross sectional view of the device shown in FIG. 5 after another permeable layer and an antireflective coating have been formed.
Figure 6B:
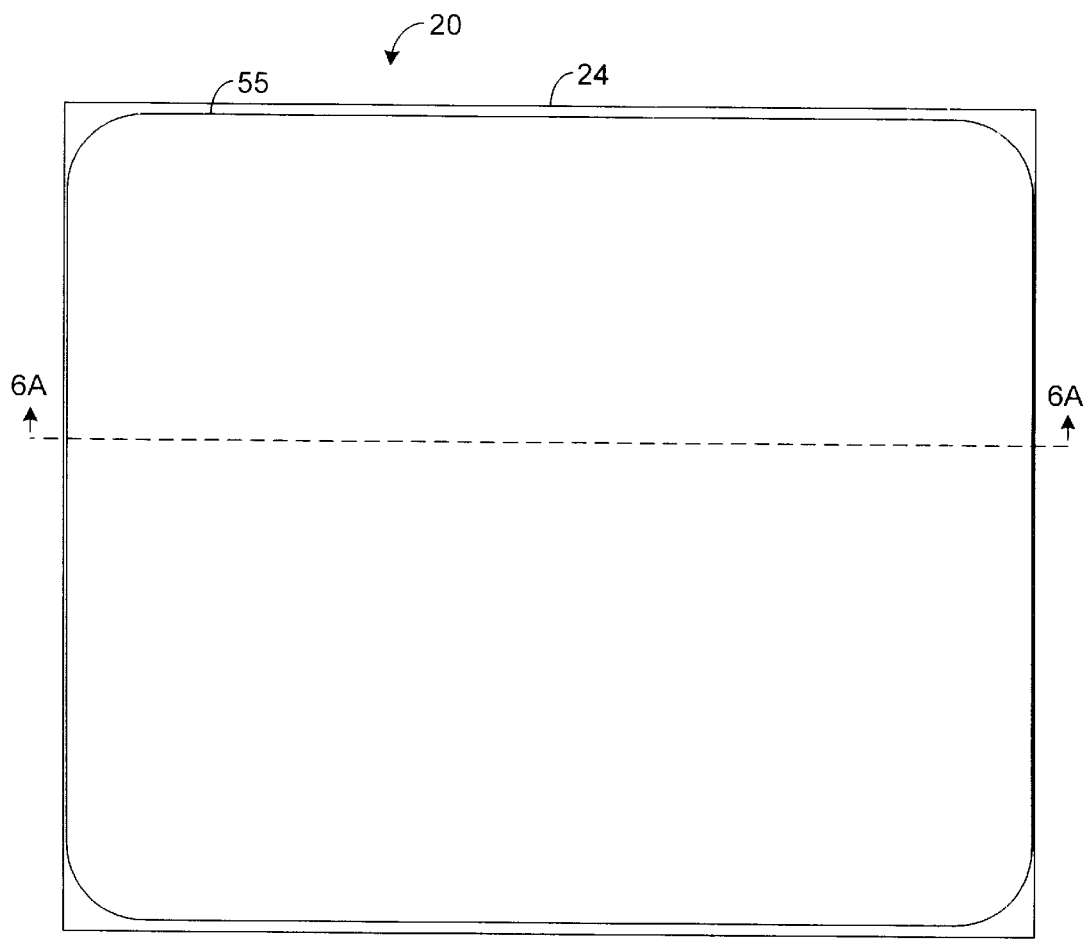
FIG. 6B is a top view of the device shown in FIG. 6A.

Although not necessary for implementation of the present invention, further processing steps can be performed on the device 20 in order to improve the performance of the device 20. For example, as depicted by FIGS. 6A and 6B, another insulator layer 52 can be formed on the transparent conductor 42 in order to protect the transparent conductor 42 and to provide mechanical robustness or abrasion resistance. Additionally, an antireflective coating 55 can be formed on the insulator layer 52 in order to improve optical performance of the device 20.

In order to provide mechanical support to the device 20 during dissipation of the sacrificial layer 31, a supporting layer can be formed on the permeable layer 35 prior to dissipation of the sacrificial layer 31. The supporting layer and the permeable layer 35 may define a single composite layer, and the supporting layer may or may not have undesirable properties that would adversely affect the performance of the device 20. Once the dissipation of the sacrificial layer 31 is complete, the supporting layer can be removed through etching or other suitable techniques known in the art. Then, the transparent conductor 42 can be formed on the permeable layer, as discussed hereinabove.

Figure 7:
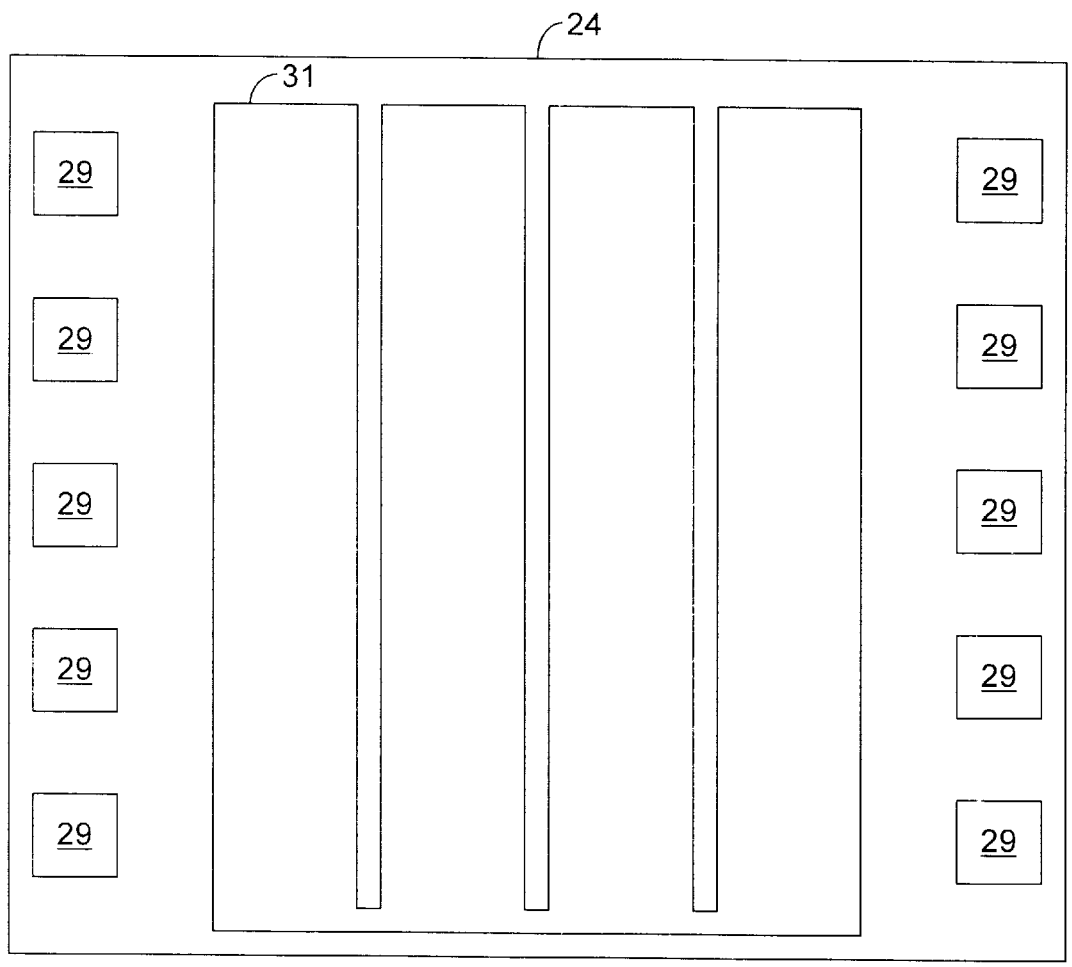
FIG. 7 is a top view of the device shown in FIG. 1 after a sacrificial layer has been formed, wherein the sacrificial layer of FIG. 7 is of a different configuration than the sacrificial layer depicted by FIG. 2.

It should be noted that other configurations of forming the sacrificial layer 31 and, hence, of forming the permeable layer 35 are possible. In this regard, the patterning of the sacrificial layer 31 determines the configuration of permeable layer 35. Since round holes are patterned into the sacrificial layer 31 in the preferred embodiment, the filling of the holes during the formation of the permeable layer 35 forms pillars 39 of permeable material which support the permeable layer 35, as depicted by FIG. 4A. However, one skilled in the art should realize that different patterning of sacrificial layer 31 may occur without departing from the principles of the present invention. For example, FIG. 7 shows a top view of device 20 after patterning of a sacrificial layer 31 and before a formation of permeable layer 35. As can be seen by reference to FIG. 7, the permeable layer 35, when formed on sacrificial layer 31, should form a plurality of walls capable of supporting the permeable layer 35 once the sacrificial layer 31 is removed. It should be apparent to one skilled in the art upon reading the present disclosure that many other variations are also possible without departing from the principles of the present invention.

Figure 8:
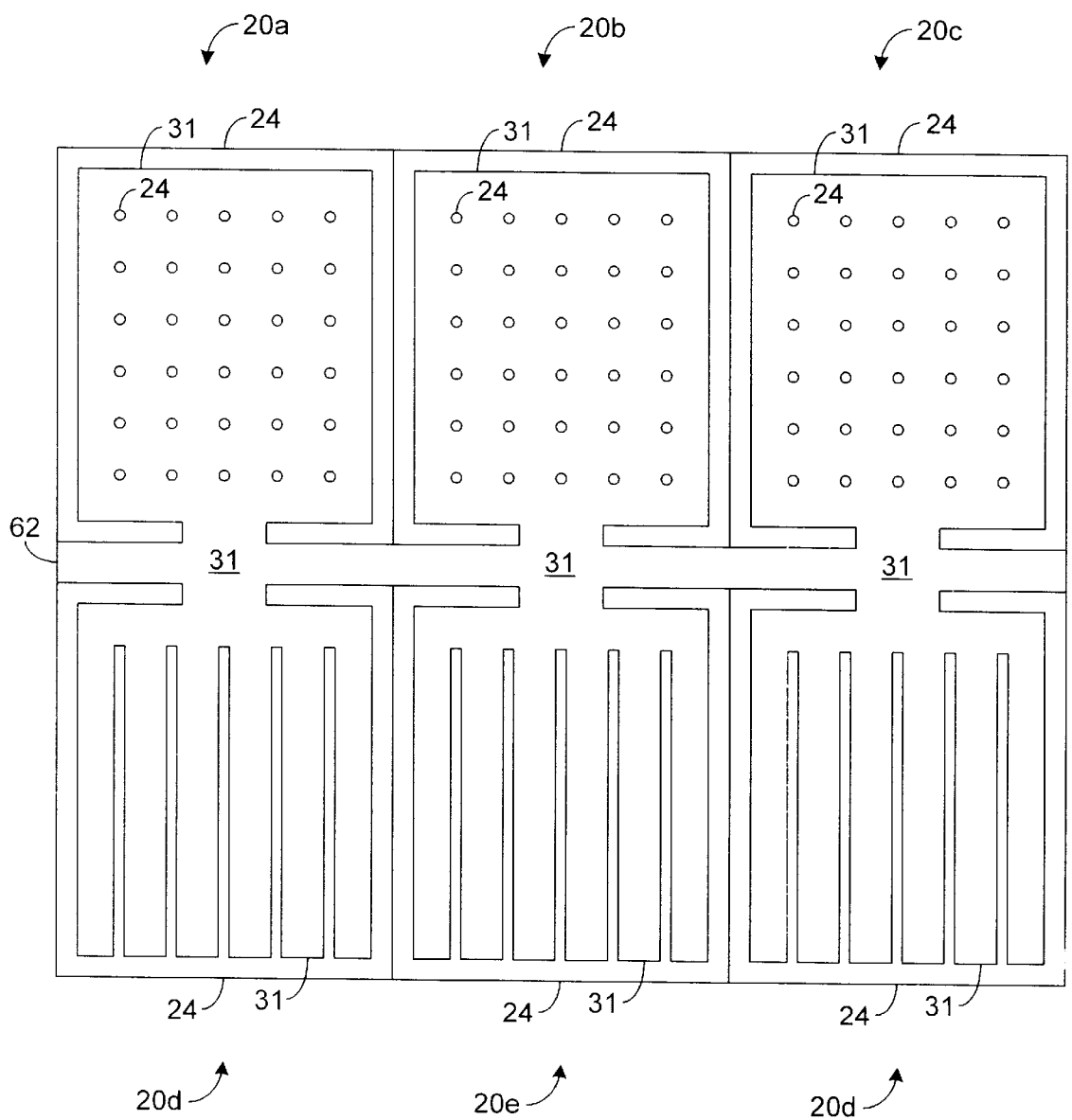
FIG. 8 is a top view showing a configuration of multiple devices depicted in FIGS. 2 and 7 that can be easily batch fabricated on a wafer scale.

Since the present invention enables microfabrication of a fully integrated device 20 on a monolithic substrate 21, the device 20 can be easily batch fabricated on a wafer-scale. FIG. 8 shows multiple devices 20a, 20b, 20c, 20d and 20e that can be disposed on a wafer though microfabrication techniques, as described hereinbefore. For simplicity, FIG. 8 depicts a top view of the devices 20 subsequent to formation of the sacrificial layer 31 but prior to the formation of the permeable layer 35. For illustrative purposes, devices 20a, 20b and 20c are manufactured according to the preferred embodiment of the present invention, and devices 20d, 20e and 20f are manufactured according to FIG. 7. Upon viewing FIG. 8, it should be apparent to one skilled in the art that once the permeable layer 35 is formed, the sacrificial layer 31 for each device can be simultaneously removed. Furthermore, liquid crystal can be inserted into each device 20 through a single puncture of the permeable layer 35. This puncture, for example, may be located at point 62. Once a wafer containing multiple devices 20 has been formed, the devices 20 can be sawn apart using a dicing saw as commonly employed in the industry, or the devices 20 can be separated into individual devices 20 according to other batch fabrication techniques known in the art. Accordingly, the manufacturing costs associated with each device 20 can be significantly reduced.

It should be apparent to one skilled in the art that each layer discussed herein may be comprised of multiple sublayers of the same or other types of material as may be desired. Furthermore, the substrate 21 may be used as the base layer for supporting the other layers of the present invention.

Alternative Embodiments

It should be noted that it is not necessary for the transparent conductor 42 to be formed on a permeable insulator 35. For example, the transparent conductor 42 can be formed directly on the sacrificial layer 31 with the permeable insulator 35 later formed on the transparent conductor 42.

Alternatively, the transparent conductor 42 can be formed between two permeable insulator layers 35 prior to dissipation of the sacrificial layer 31. In this regard, a first permeable insulator 35 is formed on the sacrificial material, and the transparent conductor 42 is then formed on the first permeable insulator 35. Then, a second permeable layer 35 is formed on the transparent conductor 35, and the sacrificial material 31 is then dissipated through each of the three layers. This configuration enables the first permeable insulator 35, which is formed on the sacrificial layer 31, to be polished thin while mechanical stability is preserved by the addition of the second permeable insulator 35 formed on the transparent conductor 42.

In another embodiment, the sacrificial layer 31 can be completely dissipated from the device 20 subsequent to the formation of the transparent conductor 42 on the permeable insulator 35.

Since the sacrificial layer 31 is dissipated from the device 20 subsequent to the formation of the transparent conductor 42 in each of these alternative embodiments, the transparent conductor 42 should also be designed as a permeable material in order to allow the sacrificial layer 31 to egress from the device 20. It is possible to design transparent conductor 42 to be thin enough to maintain adequate conductivity and still allow the sacrificial layer 31 to dissipate. Indium tin oxide is an example of a material having properties suitable for this type of conductor 42. Furthermore, the permeability of the transparent conductor 42 can be enhanced by adjusting the formation rate of the conductor's 42 material. The permeability of the conductor 42 can also be enhanced by systematically creating pores (at the nanometer scale) in the material, such that (a) the conductor 42 remains contiguous and retains adequate conductivity, (b) the pores are sufficiently small that the uniformity of the electric field across the liquid crystal is negligibly degraded, and (c) the pores are sufficiently dense that the sacrificial layer 31 can adequately pass through the transparent conductor 42. Such material can be formed by bombardment of airborne abrasive powders, by rubbing, by polishing, by nanolithography or any other suitable technique.

Sacrificial Material

The sacrificial layer 31 should be comprised of a material capable of dissipating through the permeable layer 35 in response to an increase in temperature. In this regard, the preferred sacrificial material for carrying out the above-described method preferably is selected from the cyclic olefin class of compounds and more preferably is a bicyclic olefin with a norbornene-type polymer being most preferred. By norbornene-type polymer is meant polycyclic addition homopolymers and copolymers comprising repeating units set forth under Formulae I, II and III below. Copolymers useful in practicing the invention can include repeating units selected from the group comprising and/or consisting of Formulae I, II and III, or combinations thereof. The polymer comprises silyl substituted repeating units represented by the structure set forth under Formula I below.

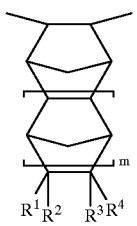

I wherein $R^1$ and $R^4$ independently represent hydrogen; linear or branched ($C_1$ to $C_{20}$) alkyl; $R^2$ and $R^3$ independently represent hydrogen, linear or branched ($C_1$ to $C_{20}$) alkyl or the group:

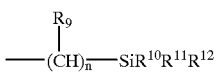

Ia

R9 independently is hydrogen, methyl, or ethyl; $R^{10}$, $R^{11}$, and $R^{12}$ independently represent linear or branched ($C_1$ to $C_{20}$) alkyl, linear or branched ($C_1$ to $C_{20}$) alkoxy, linear or branched ($C_1$ to $C_{20}$) alkyl carbonyloxy (e.g., acetoxy), and substituted or unsubstituted ($C_6$ to $C_{20}$) aryloxy; m is a number from 0 to 4; and n is a number from 0 to 5. In Formula I at least one of substituents $R^2$ and $R^3$ must be selected from the silyl group represented by the formula set forth under Ia.

Preferably, at least one of $R^{10}$, $R^{11}$, or $R^{12}$ is selected from a linear or branched ($C_1$ to $C_{10}$) alkoxy group and $R^9$ is hydrogen. More preferably, each of $R^{10}$, $R^{11}$, and $R^{12}$ are the same and are selected from methoxy, ethoxy, propoxy, butoxy, and pentoxy. Most preferably, n is 0 and $R^{10}$, $R^{11}$, and $R^{12}$ are each ethoxy groups, e.g., $R^2$ and/or $R^3$ is most preferably a triethoxysilyl substituent. When n is 0, it is evident that the silyl functionality is connected directly to the polycyclic ring through a silicon-carbon bond wherein the carbon atom of said silicon-carbon bond is supplied by a carbon atom on the polycyclic ring (i.e., a ring carbon atom).

In Formula I above, m is preferably 0 or 1 as represented by structures Ib and Ic, respectively, below:

Ib

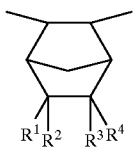

Ic

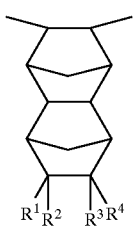

wherein $R^1$ to $R^4$ are as previously defined and at least one of $R^2$ and $R^3$ must be a silyl substituent represented by Ia. Repeating units where m is 0, i.e., repeating units of structure Ib, are especially preferred.

In Formulae I, Ib, and Ic $R^1$ and $R^4$ can taken together with the two ring carbon atoms to which they are attached to represent a saturated cyclic group of 4 to 8 carbon atoms. When $R^1$ and $R^4$ are taken together to form a saturated cyclic group, the cyclic group is substituted by $R^2$ and $R^3$ at least one of which must be a silyl group represented by Ia. Generically such monomers are represented by the following structure:

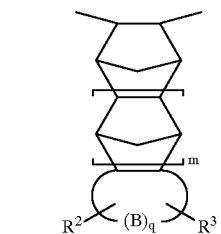

wherein B is a methylene (i.e., —$CH_2$—) group and q is a number from 2 to 6. It should be apparent that when the methylene group represented by B contains an $R^2$ or $R^3$ substituent, one of the hydrogen atoms of the —$CH_2$— group is replaced by the $R^2$ or $R^3$ substituent. Representative repeating unit structures are set forth below:

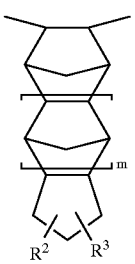

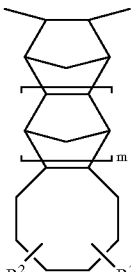

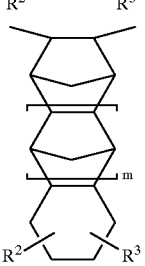

wherein $R^2$, $R^3$, and m are as previously defined.

Illustrative examples of monomers of Formula I include 5-triethoxysilyl-norbornene, 5-trimethylsilyl norbornene, 5-trimethoxysilyl norbornene, 5-methyldimethoxysilyl norbornene, 5-dimethylmethoxy norbornene.

In another embodiment of the present invention, the sacrificial polymer comprises hydrocarbyl substituted polycyclic repeating units selected from units represented by Formula II below:

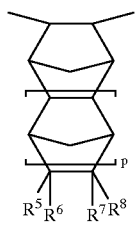

wherein $R^5$, $R^6$, $R^7$, and $R^8$ independently represent hydrogen. linear and branched ($C_1$ to $C_{20}$) alkyl, hydrocarbyl substituted and unsubstituted ($C_5$ to $C_{12}$) cycloalkyl, hydrocarbyl substituted and unsubstituted ($C_6$ to $C_{40}$) aryl, hydrocarbyl substituted and unsubstituted ($C_7$ to $C_{15}$) aralkyl, ($C_3$ to $C_{20}$) alkynyl, linear and branched ($C_3$ to $C_{20}$) alkenyl, or vinyl; any of $R^5$ and $R^6$ or $R^7$ and $R^8$ can be taken together to form a ($C_1$ to $C_{10}$) alkylidenyl group, $R^5$ and $R^8$ when taken with the two ring carbon atoms to which they are attached can represent saturated and unsaturated cyclic groups containing 4 to 12 carbon atoms or an aromatic ring containing 6 to 17 carbon atoms; and p is 0, 1, 2, 3, or 4. The hydrocarbyl substituents on the foregoing substituents are composed solely of carbon and hydrogen atoms, such as, for example, branched and unbranched ($C_1$ to $C_{10}$) alkyl, branched and unbranched ($C_2$ to $C_{10}$) alkenyl, and ($C_6$ to $C_{20}$) aryl.

Illustrative examples of hydrocarbyl substituted monomers include 2-norbornene, 5-methyl-2-norbornene, 5-hexyl-2-norbornene, 5-cyclohexyl-2-norbornene, 5-cyclohexenyl-2-norbornene, 5-butyl-2-norbornene, 5-ethyl-2-norbornene, 5-decyl-2-norbornene, 5-phenyl-2-norbornene, 5-naphthyl-2-norbornene 5-ethylidene-2-norbornene, vinylnorbornene, dicyclopentadiene, dihydrodicyclopentadiene, tetracyclododecene, methyltetracyclododecene, tetracyclododecadiene, dimethyltetracyclododecene, ethyltetracyclododecene, ethylidenyl tetracyclododecene, phenyltetracyclododecene, trimers of cyclopentadiene (e.g., symmetrical and asymmetrical trimers). An especially preferred hydrocarbyl repeating unit is derived from 2-norbornene.

In another embodiment of the invention, a sacrificial polymer useful in carrying out the invention comprises repeating units represented by Formula III below:

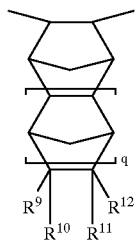

wherein $R^9$ to $R^{12}$ independently represent a polar substituent selected from the group: $(A)_n$—C(O)OR", —$(A)_n$—OR, —$(A)_n$—OC(O)R", —$(A)_n$—OC(O)OR", —$(A)_n$—C(O)R", —$(A)_n$—OC(O)C(O)OR", —$(A)_n$—O—A'—C(O)OR", —$(A)_n$—OC(O)—A'—C(O)OR", —$(A)_n$—C(O)O—A'—C(O)OR", —$(A)_n$—C(O)—A'—OR", —$(A)_n$—C(O)O—A'—OC(O)OR", —$(A)_n$—C(O)O—A'—O—A'—C(O)OR", —$(A)_n$—C(O)O—A'—OC(O)C(O)OR", —$(A)_n$—C(R)$_2$CH(R")(C(O)OR"), and —$(A)_n$—C(R")$_2$CH(C(O)OR")$_2$. The moieties A and A' independently represent a divalent bridging or spacer radical selected from divalent hydrocarbon radicals, divalent cyclic hydrocarbon radicals, divalent oxygen containing radicals, and divalent cyclic ethers and cyclic diethers, and n is an integer 0 or 1. When n is 0 it should be apparent that A represent a single covalent bond. By divalent is meant that a free valence at each terminal end of the radical are attached to two distinct groups. The divalent hydrocarbon radicals can be represented by the formula —$(C_dH_{2d})$— where d represents the number of carbon atoms in the alkylene chain and is an integer from 1 to 10. The divalent hydrocarbon radicals are preferably selected from linear and branched ($C_1$ to $C_{10}$) alkylene such as methylene, ethylene, propylene, butylene, pentylene, hexylene, heptylene, octylene, nonylene, and decylene. When branched alkylene radicals are contemplated, it is to be understood that a hydrogen atom in the linear alkylene chain is replaced with a linear or branched ($C_1$ to $C_5$) alkyl group.

The divalent cyclic hydrocarbon radicals include substituted and unsubstituted ($C_3$ to $C_8$) cycloaliphatic moieties represented by the formula:

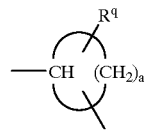

wherein a is an integer from 2 to 7 and $R^q$ when present represents linear and branched ($C_1$ to $C_{10}$) alkyl groups. Preferred divalent cycloalkylene radicals include cyclopentylene and cyclohexylene moieties represented by the following structures:

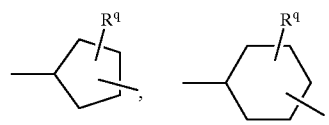

wherein $R^q$ is defined above. As illustrated here and throughout this specification, it is to be understood that the bond lines projecting from the cyclic structures and/or formulae represent the divalent nature of the moiety and indicate the points at which the carbocyclic atoms are bonded to the adjacent molecular moieties defined in the respective formulae. As is conventional in the art, the diagonal bond line projecting from the center of the cyclic structure indicates that the bond is optionally connected to any one of the carbocyclic atoms in the ring. It is also to be understood that the carbocyclic atom to which the bond line is connected will accommodate one less hydrogen atom to satisfy the valence requirement of carbon.

Preferred divalent cyclic ethers and diethers are represented by the structures:

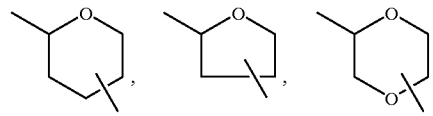

The divalent oxygen containing radicals include ($C_2$ to $C_{10}$) alkylene ethers and polyethers. By ($C_2$ to $C_{10}$) alkylene ether is meant that the total number of carbon atoms in the divalent ether moiety must at least be 2 and can not exceed 10. The divalent alkylene ethers are represented by the formula -alkylene-O-alkylene- wherein each of the alkylene groups that are bonded to the oxygen atom can be the same or different and are selected from methylene, ethylene, propylene, butylene, pentylene, hexylene, heptylene, octylene, and nonylene. The simplest divalent alkylene ether of the series is the radical —CH$_2$—O—CH$_2$—. Preferred polyether moieties include divalent radicals of the formula:

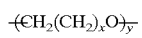

wherein x is an integer from 0 to 5 and y is an integer from 2 to 50 with the proviso that the terminal oxygen atom on the polyether spacer moiety can not be directly linked to a terminal oxygen atom on an adjacent group to form a peroxide linkage. In other words, peroxide linkages (i.e., —O—O—) are not contemplated when polyether spacers are linked to any of the terminal oxygen containing substituent groups set forth under $R^9$ to $R^{12}$ above.

$R^9$ to $R^{12}$ can also independently represent hydrogen, linear and branched ($C_1$ to $C_{10}$) alkyl, so long as at least one of the remaining $R^9$ to $R^{12}$ substituents is selected from one of the polar groups represented above. In the formula above p is an integer from 0 to 5 (preferably 0 or 1, more preferably 0). R" independently represents hydrogen, linear and branched ($C_1$ to $C_{10}$) alkyl (e.g., —C(CH$_3$)), —Si(CH$_3$), —CH(R$^P$)OCH$_2$CH$_3$, —CH(R$^P$)OC(CH$_3$)$_3$, linear and branched ($C_1$ to $C_{10}$) alkoxyalkylene, polyethers, monocyclic and polycyclic ($C_4$ to $C_{20}$) cycloaliphatic moieties, cyclic ethers, cyclic ketones, and cyclic esters (lactones). By ($C_1$ to $C_{10}$) alkoxyalkylene is meant that a terminal alkyl group is linked through an ether oxygen atom to an alkylene moiety. The radical is a hydrocarbon based ether moiety that can be generically represented as -alkylene-O-alkyl wherein the alkylene and alkyl groups independently contain 1 to 10 carbon atoms each of which can be linear or branched. The polyether radical can be represented by the formula:

wherein x is an integer from 0 to 5, y is an integer from 2 to 50 and $R^a$ represents hydrogen or linear and branched ($C_1$ to $C_{10}$) alkyl. Preferred polyether radicals include poly (ethylene oxide) and poly(propylene oxide). Examples of monocyclic cycloaliphatic monocyclic moieties include cyclopropyl, cyclobutyl, cyclopentyl, cyclohexyl, dicyclopropylmethyl (Dcpm) and dimethylcyclopropylmethyl (Dmcp), and the like. Examples of cycloaliphatic polycyclic moieties include, norbornyl, adamantyl, tetrahydrodicyclopentadienyl (tricyclo[5.2.1.0$^{2,6}$] decanyl), and the like. Examples of cyclic ethers include tetrahydrofuranyl and tetrahydropyranyl moieties. An example of a cyclic ketone is a 3-oxocyclohexanonyl moiety. An example of a cyclic ester or lactone is a mevalonic lactonyl moiety. Structures for representative cyclic groups set forth above include:

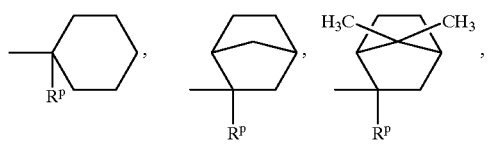

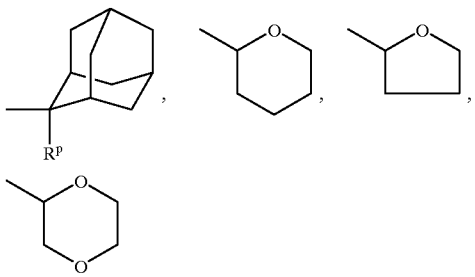

wherein $R^P$ in the above formulae and cyclic groups represents hydrogen or a linear or branched ($C_1$ to $C_5$) alkyl group. The Dcpm and Dmcp substituents are represented, respectively, as follows:

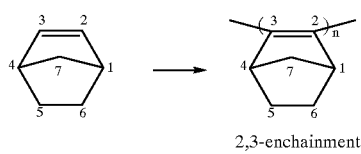

The sacrificial polymers useful in practicing the present invention preferably encompass homopolymers and copolymers containing random repeating units derived from a monomer unit or monomer units represented by Formula I, or homopolymers or copolymers containing random repeating units derived from monomer unit or units represented by Formula II, homopolymers or copolymers containing repeating units derived from a monomer unit(s) represented by Formula III and copolymers comprising a combination of repeating units represented by Formulae I and II, Formulae I and III, Formulae II and III or Formulae I, II and III.

Preferred sacrificial polymers according to the present invention may contain from about 0.1 to 100 mole percent of silyl functional polycyclic repeating units, preferably from about 1 to 50 mole percent, more preferably from about 3 to 25 mole percent. and most preferably from about 5 to 20 mole percent, with the remainder of the polymer preferably comprising repeating units described under Formula II and/or Formula III. An especially preferred polymer comprises repeating units polymerized from norbornene and triethoxysilylnorbonene in a mole percent ratio of 80/20 norbornene/triethoxysilylnorbonene.

Preferred sacrificial polymers according to present invention are addition polymers comprising polycyclic repeating units that are connected to one another via 2,3-linkages that are formed across the double bond contained in the norbornene-type moiety of the prepolymerized polycyclic monomer.

2,3-enchainment

The polymers may be polymerized from appropriately functionalized norbornene-type monomers in the presence of a single or multi-component Group VIII transition conductive catalyst system as described in International Patent Application Publication No. WO 97/20871 to The BFGoodrich Company, published on Jun. 12, 1997, which is hereby incorporated herein by reference in its entirety.

The polynorbornene-type polymer is particularly beneficial because it has a high (>350 degrees C) glass-transition temperature (Tg) and sufficient thermal stability to accommodate a number of commonly employed and other semiconductor manufacturing steps such as plasma enhanced chemical vapor deposition (PECVD) of $SiO_2$ and low temperature copper annealing, and has a decomposition temperature approximately equal to its Tg, thereby limiting movement which might damage the semiconductor device.

It is believed that the polycyclic olefinic polymers utilized in practicing this invention are uniquely suited as sacrificial materials in semiconductor device manufacturing because the material thermally decomposes close to its Tg. In other words, the polymer remains mechanically stable until the decomposition temperature is reached enabling the polymer to endure the rather harsh processing steps (e.g., repeated heat cycles) during semiconductor manufacture. The disadvantage with the prior art polymers is that their Tg's are well below their decomposition temperatures leading to mechanical failure before the decomposition temperature is reached.

It has been found that by incorporating polycyclic olefinic repeating units that contain pendant hydrocarbyl (Formula II) and/or pendant polar (Formula III) substituents into the sacrificial polymer backbone the decomposition temperatures of the silyl substituted polycyclic olefinic polymer can be significantly lowered. The decomposition temperature of polymers containing 80/20 mole percent of norbornene/triethoxysilylnorbonene (approximately 430 degrees C) can be lowered by approximately 30 degrees C by replacing the norbornene repeating units in the copolymer with repeating units containing pendant linear and/or branched (C1 to C20) alkyl substituents. For example, the thermal decomposition temperature for a copolymer containing butylnorbornene/triethoxysilylnorbornene in a mole percent ratio of 95/5 is lowered to 405 degrees C. We expect that the decomposition temperature of the copolymer can be lowered even further (up to approximately 100 degrees C) by replacing the norbornene repeating units in the copolymer with repeating units containing the polar substituents described under Formula III. Homopolymers of norbornyl acetate and norbornyl ethyl carbonate have thermal decomposition temperatures of 356 degrees C and 329 degrees C, respectively. The polar groups include ester, carbonate, and acetate substituents and the like. To effect lower decomposition temperatures of the silyl substituted polymers, the polymer should contain about 50 mole percent of polycyclic repeating units having pendant hydrocarbyl or polar functionality, preferably greater than 50 mole percent, more preferably 51 to 99 percent, still more preferably 55 to 95 mole percent, even more preferably 65 to 80 mole percent.

The aforesaid sacrificial polymers can be heated to above their decomposition temperature, typically in the range of about 380 degrees C to about 450 degrees C, to cause the polymers to decompose into their decomposition products which can diffuse through various materials used to form semiconductor devices including air gaps. The materials include polymer insulators such as silicon dioxide, silicon nitride, silicon oxynitride, and polyimides. Particularly useful polymers are those that are photosensitive, as will become evident from the following description of other exemplary methods illustrating other aspects of the invention.

Utilization of the materials for sacrificial layer 31 described hereinabove enables the sacrificial layer 31 to dissolve into and dissipate through the permneable layer 35 in response to a temperature increase. However, other materials for sacrificial layer 31 and permeable layer 35 can be sufficient for implementing the present invention.

OPERATION

The preferred use and operation of the present invention is described hereafter with reference to FIGS. 1–6.

Conductive pads 27 are formed on a substrate 21 and an insulator layer 24, as depicted by FIG. 1. The conductive pads 27 are preferably coupled to circuitry capable of addressing the conductive pads 27. As depicted by FIG. 2, sacrificial material 31 is formed on conductive pads 27 and exposed portions of insulator layer 24 through suitable techniques, such as spin-deposition. Portions of the sacrificial layer 31 are preferably removed, for example by dry etching, in order to expose portions of the underlying surface to which the sacrificial layer 31 is attached.

As depicted by FIG. 3, permeable insulator material 35 is then formed on the sacrificial material 31 through suitable microfabrication techniques, such as deposition. The device 20 is then heated to a sufficient temperature to cause the sacrificial material 31 to change into a gaseous state. The gaseous sacrificial material 31 dissipates through the permeable material 35 to leave a hollow area 37 in the device, as depicted by FIG. 4.

The transparent conductor 42 is then formed on the permeable material 35. The transparent conductor 42 is preferably connected to contacts 29 which are at a common voltage. The permeable material 35 and the transparent conductor 42 are punctured, and the hollow area 37 is filled with liquid crystal. The device 20 is completed by forming more insulator material 52 on the transparent conductor 42 and by forming an anitreflective coating 55 on the newly formed insulator material 52.

Since transparent conductor 42 is connected to contacts 29, transparent conductor 42 is maintained at a particular voltage. When it becomes desirable to change the optical properties of the liquid crystal residing between a particular conductive pad 27 and transparent conductor 42, the circuitry connected to the particular pad 27 addresses the particular pad 27. This causes the voltage of pad 27 to change, thereby changing the voltage potential between transparent conductor 42 and the addressed conductive pad 27. As a result, the electric field applied across the liquid crystal located between the transparent conductor 42 and the addressed conductive pad 27 changes. This change in the electric field causes the optical properties of the liquid crystal exposed to the electric field to change. Therefore, the appearance of the liquid crystal, which can be seen by an observer, changes. By controlling the electric field of each of the conductive pads 27 in a similar fashion, the liquid crystal within the hollow area 37 can be configured to display a particular pattern, such as a letter or a number, for example. Therefore, a liquid crystal display capable of providing useful information is defined by the device 20.

Since the device 20 is fully integrated on a monolithic substrate and a separate cover does not need to be attached to each display unit, the liquid display device 20 of the present invention can be manufactured through additive thin-film processing of the substrate and batch fabricated at a reduced cost. Furthermore, since the sacrificial material 31 can be dissipated through permeable layer 35, an opening does not need to be formed to allow the sacrificial material 31 to exit the device 20, and potentially harmful solutions do not have to introduced to the device 20 to react with the sacrificial material 31. Therefore, a more efficient and reliable liquid crystal display 20 can be manufactured by utilizing the principles of the present invention.

In concluding the detailed description, it should be noted that it will be obvious to those skilled in the art that many variations and modifications may be made to the preferred embodiment without substantially departing from the principles of the present invention. All such variations and modifications are intended to be included herein within the scope of the present invention, as set forth in the following claims.

Now, therefore, the following is claimed:

1. A microfabricated system, comprising:
   a base having a conductive pad formed thereon;
   permeable material formed on sacrificial material, said sacrificial material configured to dissolve into and dissipate through said permeable material when said sacrificial material is heated in order to form a cavity between said conductive pad and said permeable material;
   liquid crystal formed within said cavity;
   a contact having a voltage; and
   a transparent conductor coupled to said contact, wherein a voltage difference between said transparent conductor and said conductive plate induces an electric field across said liquid crystal.

2. The system of claim 1, wherein said sacrificial material is a cyclic polyoletin.

3. The system of claim 1, wherein said sacrificial material decomposes at a temperature having a value approximately equal to a glass-transition temperature value of said sacrificial material.

4. The system of claim 1, further including a means for filling said cavity with said liquid crystal through a single opening to said cavity.

5. The system of claim 1, wherein said conductive pad includes an alignment layer coupled to said sacrificial material.

6. The system of claim 1, further including an alignment layer formed between said sacrificial material and said permeable material.

7. The system of claim 1, wherein said system is formed on a monolithic substrate.

8. The system of claim 7, wherein said permeable material forms an insulator.

9. The system of claim 7, further comprising circuitry coupled to said conductive pad, said circuitry configured to change a voltage of said conductive pad in order to change said electric field appearing across said liquid crystal.

10. The system of claim 1, wherein said system is fully integrated.

11. The system of claim 1, wherein said system is formed through additive thin-film processing of a substrate.

12. A method for microfabricating a liquid crystal display, comprising the steps of:
   forming a conductive pad on a base;
   forming sacrificial material on said conductive pad;
   patterning said sacrificial material to expose a portion of said base;
   forming permeable material on said sacrificial material and said exposed portion of said base;
   dissipating said sacrificial material through said permeable material in order to form a cavity;
   filling said cavity with liquid crystal;
   forming a transparent conductor; and
   creating a voltage difference between said transparent conductor and said conductive pad to apply an electric field across said liquid crystal.

13. The method of claim 12, further comprising the step of dissolving said sacrificial material into said permeable material.

14. The method of claim 12, further comprising the step of polishing said sacrificial material.

15. The method of claim 12, further comprising the step of forming said transparent conductor with said permeable material.

16. The method of claim 12, further comprising the step of forming said transparent conductor on said sacrificial material.

17. The method of claim 12, further comprising the step of forming said liquid crystal display on a monolithic substrate.

18. The method of claim 12, further comprising the step of forming said permeable material on said exposed portion of said base.

19. The method of claim 12, furthering comprising the step of puncturing said permeable layer to form an opening to said cavity.

20. The method of claim 12, further comprising the steps of:
   forming supporting material in order to provide mechanical support during said dissipating step; and
   removing said supporting material.

21. A method for forming a fully integrated liquid crystal display, comprising the steps of:
   depositing a sacrificial layer on a surface of a microfabricated structure;
   depositing a permeable layer on said sacrificial material;
   dissipating said sacrificial material through said permeable layer in order to form a cavity within said liquid crystal display;
   inserting liquid crystal into said cavity;
   forming a transparent conductor and a conductive pad; and
   inducing an electric field to appear across said liquid crystal by creating a voltage difference between said transparent conductor and said conductive pad.

22. The method of claim 21, further comprising the step of patterning said sacrificial layer to expose said surface.

23. The method of claim 22, further comprising the step of forming a monolithic liquid crystal display.

24. The method of claim 22, further comprising the step of filling patterns of said sacrificial layer in order to engage permeable material associated with said permeable layer to exposed portions of said surface.

25. The method of claim 24, further including the step of puncturing said permeable layer in order to form an opening extending through said permeable layer to said cavity.

26. The method of claim 21, further comprising the step of dissolving said sacrificial material into said permeable layer.

27. The method of claim 21, forming said transparent conductor with said permeable material.

28. A method for microfabricating a liquid crystal display, comprising the steps of:
   forming a conductive pad on a base of said liquid crystal display;
   forming sacrificial material on said conductive pad;
   forming permeable material on said sacrificial material;
   dissolving said sacrificial material into said permeable material in order to form a cavity; and
   filling said cavity with liquid crystal.

29. The method of claim 28, further comprising the steps of:

patterning said sacrificial material to form holes in said sacrificial material; and filling said holes with said permeable material during said forming permeable material step.

30. The method of claim 28, further comprising the step of dissipating said sacrificial material from said permeable material.

31. The method of claim 28, further comprising the step of forming a transparent conductor on said sacrificial material.

32. The method of claim 28, further comprising the step of forming a transparent conductor on said permeable material.

33. The method of claim 32, further comprising the steps of:

polishing said permeable material in order to reduce said permeable material; and forming other permeable material on said transparent conductor.

34. The method of claim 28, further comprising the step of forming a fully integrated liquid crystal display.

* * * * *

United States Patent And Trademark Office
CERTIFICATE OF CORRECTION

PATENT NO. : 6,141,072
DATED : October 31, 2000
INVENTOR(S): Drabik et al.

It is certified that error appears in the above-identified patent and that said Letters Patent is hereby corrected as shown below.

Col. 18, line 56, after "21," insert -- further comprising the step of --

Signed and Sealed this

Twenty-ninth Day of May, 2001

Attest:

NICHOLAS P. GODICI

Attesting Officer    Acting Director of the United States Patent and Trademark Office